United States Patent
Phillips et al.

(10) Patent No.: US 9,666,995 B1
(45) Date of Patent: May 30, 2017

(54) EMI CONTAINMENT CAGE MEMBER

(71) Applicant: TYCO ELECTRONICS CORPORATION, Berwyn, PA (US)

(72) Inventors: Michael John Phillips, Camp Hill, PA (US); Randall Robert Henry, Harrisburg, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 0 days.

(21) Appl. No.: 15/230,770

(22) Filed: Aug. 8, 2016

(51) Int. Cl.
*H01R 13/6581* (2011.01)
*G02B 6/42* (2006.01)

(52) U.S. Cl.
CPC ....... *H01R 13/6581* (2013.01); *G02B 6/4277* (2013.01); *G02B 6/4292* (2013.01)

(58) Field of Classification Search
CPC ............ H01R 13/6581; H01R 13/6593; H01R 13/6594
USPC .............. 439/607.55, 607.01, 607.2, 607.21, 439/607.22
See application file for complete search history.

(56) References Cited

U.S. PATENT DOCUMENTS

| | | | | |
|---|---|---|---|---|
| 6,478,622 B1 * | 11/2002 | Hwang | ............ | H01R 13/65802 385/92 |
| 6,666,720 B1 * | 12/2003 | Reisinger | ......... | H01R 13/65802 439/607.13 |
| 6,729,905 B1 * | 5/2004 | Hwang | ............ | H01R 13/65802 439/607.21 |
| 6,752,663 B2 | 6/2004 | Bright et al. | | |
| 6,780,053 B1 * | 8/2004 | Yunker | ................ | G02B 6/4201 439/607.2 |
| 7,557,306 B2 | 7/2009 | Chen et al. | | |
| 7,727,018 B2 | 6/2010 | Bright et al. | | |
| 7,857,662 B2 * | 12/2010 | Gillespie | .......... | H01R 13/65802 385/62 |
| 9,035,199 B2 * | 5/2015 | Janota | .................. | H05K 9/0007 174/355 |
| 2002/0072274 A1 * | 6/2002 | Flickinger | ........ | H01R 13/65802 439/607.2 |
| 2004/0077217 A1 * | 4/2004 | Hwang | .............. | H01R 23/6873 439/607.2 |
| 2007/0212942 A1 * | 9/2007 | Long | .................... | G02B 6/4201 439/607.17 |
| 2008/0102699 A1 * | 5/2008 | Chen | .................... | G02B 6/4277 439/607.01 |
| 2008/0242127 A1 * | 10/2008 | Murr | .................... | H01R 13/665 439/79 |

(Continued)

*Primary Examiner* — Tulsidas C Patel
*Assistant Examiner* — Marcus Harcum

(57) ABSTRACT

A connector assembly includes a cage member for EMI containment for a pluggable module having a cage sleeve defining a chamber, a base coupled to the cage sleeve, and a cage liner received in the chamber. The cage liner defines a module cavity configured to receive a pluggable module. The cage sleeve extends between a front end and a rear end and includes a plurality of cage walls defining the chamber and surrounding a communication connector at or near the rear end. The cage liner is electrically connected to the cage sleeve and surrounds a mating perimeter of the pluggable module. The cage liner extends a majority of a length of the pluggable module within the chamber to provide EMI shielding for the pluggable module. The cage liner provides an electrical path between the pluggable module and the cage sleeve.

20 Claims, 6 Drawing Sheets

(56) References Cited

U.S. PATENT DOCUMENTS

| | | | |
|---|---|---|---|
| 2009/0124127 A1* | 5/2009 | Zhang | H01R 13/65802 |
| | | | 439/607.38 |
| 2013/0189856 A1* | 7/2013 | Ko | H04B 10/60 |
| | | | 439/65 |
| 2013/0210275 A1* | 8/2013 | Fish | H01R 13/6658 |
| | | | 439/620.01 |

* cited by examiner

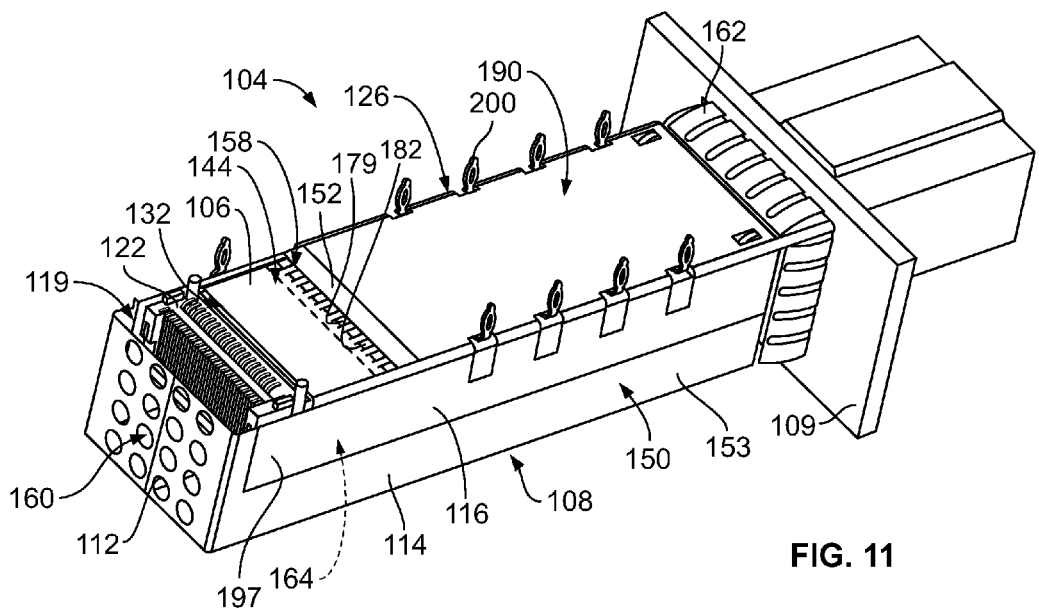
FIG. 11
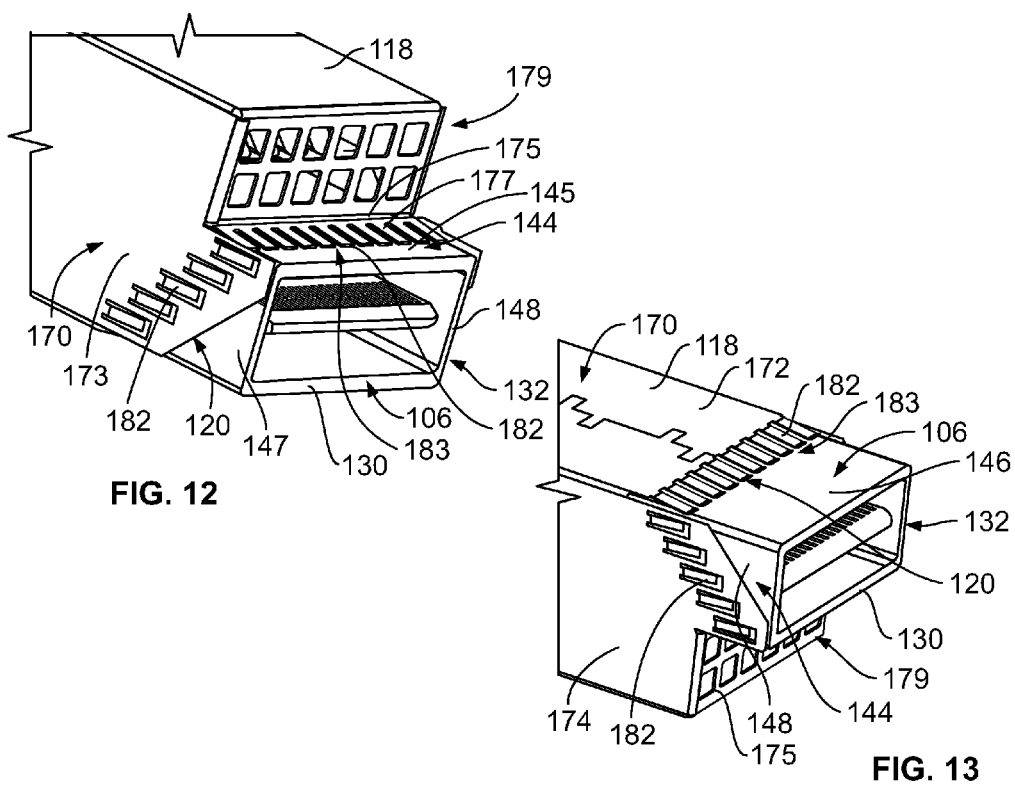
FIG. 12
FIG. 13

EMI CONTAINMENT CAGE MEMBER

BACKGROUND OF THE INVENTION

The subject matter described herein relates to EMI shielding for pluggable modules.

At least some known communication systems include receptacle assemblies, such as input/output (I/O) connector assemblies, that are configured to receive a pluggable module and establish a communicative connection between the pluggable module and an electrical connector of the receptacle assembly. As one example, a known receptacle assembly includes a cage member that is mounted to a circuit board and configured to receive a small form-factor (SFP) pluggable transceiver. The receptacle assembly includes an elongated cavity that extends between an opening of the cavity and an electrical connector that is disposed within the cavity and mounted to the circuit board. The pluggable module is inserted through the opening and advanced toward the electrical connector in the cavity. The pluggable module and the electrical connector have respective electrical contacts that engage one another to establish a communicative connection.

One challenge often encountered in the design of the pluggable module and receptacle assembly is the containment and management of electromagnetic interference (EMI), which negatively affects module/system electrical performance. For example, the stamped and formed parts typically have openings or slots formed therein from the stamping and forming process, which operate as EMI leakage locations as well as seams along the parts and at the interfaces between the parts. Typically, EMI gaskets are provided at openings to contain EMI leakage in the system and/or to block EMI radiation from entering the system. The cage members are thus manufactured from many pieces causing manufacturing difficulties and expense as well as assembly difficulty. Additionally, the cage members typically include EMI gaskets at the port opening to the module cavity that block substantially all of the space in the opening around the pluggable module with metal beams or fingers. However, such EMI gaskets have the negative effect of blocking airflow through the opening, which could be used to cool the pluggable module and other components of the system. Some known communication systems are designed to provide a large airflow channel at the opening to encourage airflow into or out of the cage member. The EMI gasket must be removed to provide the airflow channel.

Accordingly, there is a need for EMI shielding of pluggable modules for use in communication systems that includes a limited number of components, attachment points and seams to improve EMI containment of the cage member.

BRIEF DESCRIPTION OF THE INVENTION

In an embodiment, a connector assembly is provided including a cage member for EMI containment for a pluggable module. The cage member has a cage sleeve defining a chamber, a base coupled to the cage sleeve and extending along a bottom of the cage member, and a cage liner received in the chamber. The cage liner defines a module cavity configured to receive a pluggable module. The cage sleeve extends between a front end and a rear end and includes a plurality of cage walls defining the chamber. The cage walls are configured to surround a communication connector at or near the rear end. The cage liner is electrically connected to the cage sleeve and is configured to surround a mating perimeter of the pluggable module forward of a mating end of the pluggable module configured to be mated with the communication connector. The cage liner extends a majority of a length of the pluggable module within the chamber to provide EMI shielding for the pluggable module. The cage liner provides an electrical path between the pluggable module and the cage sleeve.

In another embodiment, a connector assembly is provided including a communication connector configured to be terminated to a circuit board having a mating interface for mating with a pluggable module and a cage member for EMI containment for the communication connector and the pluggable module. The cage member is configured to be terminated to the circuit board. The cage member defines a chamber receiving the communication connector and configured to receive the pluggable module. The cage member includes a cage sleeve including a plurality of cage walls defining the chamber. The cage sleeve extends between a front end and a rear end. The cage sleeve receives the pluggable module through the front end. The cage sleeve surrounds the communication connector at or near the rear end. The cage member includes a base coupled to the cage sleeve and extending along a bottom of the cage member between the cage sleeve and the circuit board. The cage member includes a cage liner received in the chamber. The cage liner defines a module cavity configured to receive the pluggable module. The cage liner has a front end and a rear end. The cage liner receives the pluggable module in the module cavity through the front end. The rear end is positioned forward of the communication connector at or near the mating interface. The cage liner is configured to surround a mating perimeter of the pluggable module forward of a mating end of the pluggable module configured to be mated with the communication connector at the mating interface. The cage liner provides an electrical path between the pluggable module and the cage sleeve.

In a further embodiment, a communication system is provided including a pluggable module including a pluggable body extending between a mating end and a cable end. The pluggable body has a top and an opposite bottom with sides extending therebetween along a length of the pluggable body. The pluggable body has a mating perimeter defined by the top, the bottom and the sides along a portion of the length forward of the mating end. The pluggable module has an internal circuit board held in the pluggable body. The communication system includes a connector assembly including a communication connector and a cage member. The communication connector having a mating interface for mating with the mating end of the pluggable module. The cage member provides EMI containment for the communication connector and the pluggable module. The cage member includes a cage sleeve, a base coupled to the cage sleeve, and a cage liner received in the cage sleeve. The cage sleeve has a plurality of cage walls defining a chamber receiving the communication connector and the pluggable module. The cage sleeve extends between a front end and a rear end, receives the pluggable module through the front end, and surrounds the communication connector at or near the rear end. The cage liner is positioned in the chamber forward of the communication connector. The cage liner defines a module cavity receiving the pluggable module. The cage liner surrounds the mating perimeter of the pluggable module forward of the mating end of the pluggable module. The cage liner provides an electrical path between the pluggable module and the cage sleeve.

BRIEF DESCRIPTION OF THE DRAWINGS

FIG. 11 is a bottom perspective view of the receptacle assembly in an assembled state showing the communication connector and the pluggable module in the cage member.

FIG. 12 is a top perspective view of a rear end of the cage liner showing the pluggable module received in the cage liner.

FIG. 13 is a bottom perspective view of the rear end of the cage liner showing the pluggable module received in the cage liner.

DETAILED DESCRIPTION OF THE INVENTION

Embodiments set forth herein include electromagnetic interference (EMI) shielding for communication systems, such as between cage members and pluggable modules. The cage member includes multiple pieces enclosing the pluggable module to provide EMI shielding. The cage member provides EMI shielding at the mating interface between the pluggable module and the communication connector of the communication system.

Figure 1:
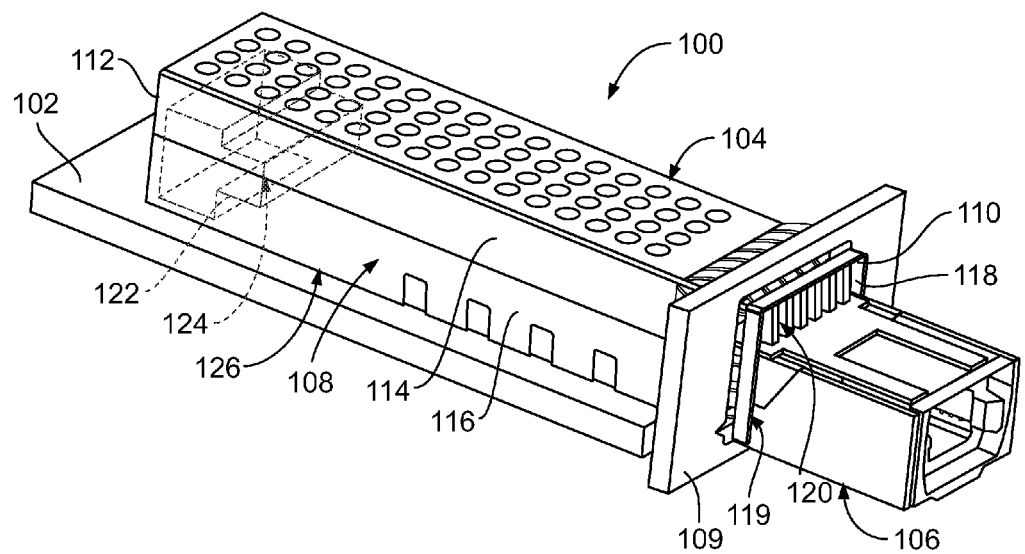
FIG. 1 is a front perspective view of a communication system in accordance with an embodiment showing a single port receptacle assembly.
Figure 2:
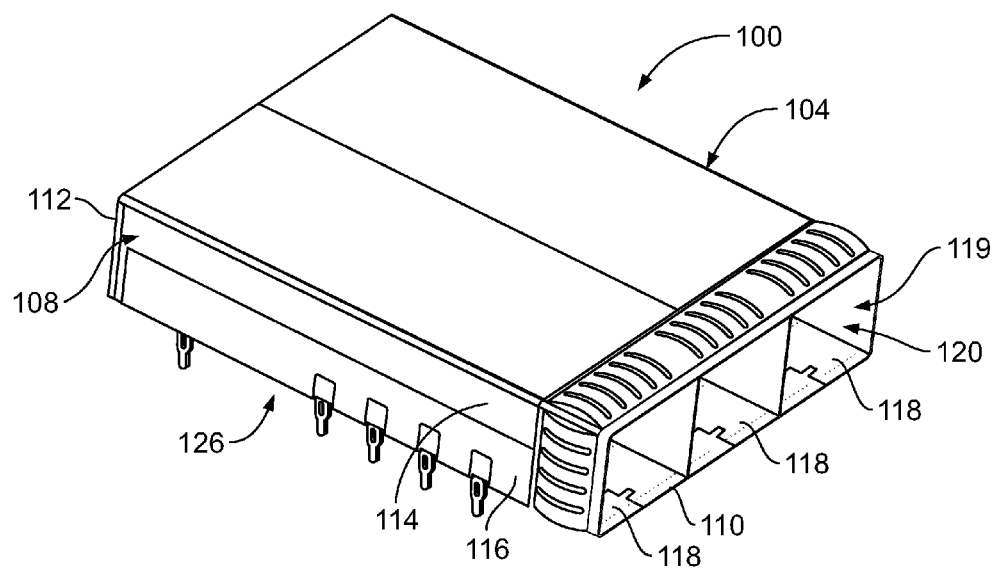
FIG. 2 is a front perspective view of the communication system in accordance with an embodiment showing a multi-port receptacle assembly.

FIG. 1 is a front perspective view of a communication system 100 in accordance with an embodiment showing a single port receptacle assembly. FIG. 2 is a front perspective view of the communication system 100 in accordance with an embodiment showing a multi-port receptacle assembly. The communication system 100 includes a circuit board 102, a receptacle assembly 104 mounted to the circuit board 102, and one or more pluggable modules 106 that are configured to communicatively engage the receptacle assembly 104. The single port receptacle assembly 104 (FIG. 1) is configured to receive a single pluggable module 106, while the multi-port receptacle assembly 104 (FIG. 2) is configured to receive multiple pluggable modules 106. FIG. 2 illustrates the multiple ports of the receptacle assembly 104 ganged side-by-side; however, the receptacle assembly 104 may include multiple ports stacked in addition to or alternative to the ganged ports.

The pluggable module 106 is an input/output (I/O) module configured to be inserted into and removed from the receptacle assembly 104. In some embodiments, the pluggable module 106 is a small form-factor pluggable (SFP) transceiver or quad small form-factor pluggable (QSFP) transceiver. The pluggable module 106 may satisfy certain technical specifications for SFP or QSFP transceivers, such as Small-Form Factor (SFF)-8431. In some embodiments, the pluggable module 106 is configured to transmit data signals up to 2.5 gigabits per second (Gbps), up to 5.0 Gbps, up to 10.0 Gbps, or more. By way of example, the receptacle assembly 104 and the pluggable module 106 may be similar to the receptacle cages and transceivers, respectively, which are part of the SFP+ product family available from TE Connectivity.

The communication system 100 may be part of or used with telecommunication systems or devices. For example, the communication system 100 may be part of or include a switch, router, server, hub, network interface card, or storage system. In various embodiments, the pluggable module 106 is configured to transmit data signals in the form of electrical signals. In other embodiments, the pluggable module 106 may be configured to transmit data signals in the form of optical signals. The circuit board 102 may be a daughter card or a mother board and include conductive traces (not shown) extending therethrough.

The receptacle assembly 104 includes a cage member 108 that is mounted to the circuit board 102. The cage member 108 may be arranged at a bezel or panel 109 of a chassis of the system or device, such as through an opening in the panel 109. As such, the cage member 108 is interior of the device and corresponding panel 109 and the pluggable module(s) 106 is loaded into the cage member 108 from outside or exterior of the device and corresponding panel 109.

The cage member 108 includes a front end 110 and an opposite rear end 112. The front end 110 may be provided at, and extend through an opening in, the panel 109. Relative or spatial terms such as "front," "back," "top," or "bottom" are only used to distinguish the referenced elements and do not necessarily require particular positions or orientations in the communication system 100 or in the surrounding environment of the communication system 100. For example, the front end 110 may be located in or facing a back portion of a larger telecommunication system. In many applications, the front end 110 is viewable to a user when the user is inserting the pluggable module 106 into the receptacle assembly 104.

The cage member 108 is configured to contain or block electromagnetic interference (EMI) and guide the pluggable module(s) 106 during a mating operation. To this end, the cage member 108 includes multiple pieces assembled together to enclose the pluggable module 106. For example, the pieces may be snap-fit together and/or welded together. When the cage member 108 is mounted to the circuit board 102, the cage member 108 is electrically coupled to the circuit board 102 and, in particular, to ground planes (not shown) within the circuit board 102 to electrically ground the cage member 108. As such, the receptacle assembly 104 may reduce EMI that may negatively affect electrical performance of the communication system 100.

In an exemplary embodiment, the cage member 108 includes a cage sleeve 114, a base 116 coupled to the cage sleeve 114, and one or more cage liners 118 (shown in FIG. 4) coupled to the cage sleeve 114 and/or the base 116. The cage sleeve 114, base 116 and cage liner 118 each include walls or panels that are interconnected to form the cage member 108. In an exemplary embodiment, the cage sleeve 114 defines the front end 110 and the rear end 112. Optionally, for the multi-port receptacle assembly 104 (FIG. 2), the cage sleeve 114 receives multiple cage liners 118 to define the multiple ports. The cage sleeve 114 surrounds all of the ports and the base 116 extends below all of the ports. For the single-port receptacle assembly 104 (FIG. 1), only one cage liner 118 is received in the cage sleeve 114.

The pieces of the cage member 108 are formed from conductive material, such as sheet metal and/or a polymer having conductive particles. In the illustrated embodiment, the pieces are stamped and formed from sheet metal. In some embodiments, the cage member 108 is configured to facilitate airflow through the cage member 108 to transfer heat (or thermal energy) away from the receptacle assembly 104 and pluggable module(s) 106. The air may flow from inside the cage member 108 (for example, behind the panel 109) to the external environment (for example, forward of the panel 109) or from outside the cage member 108 into the interior of the cage member 108. Fans or other air moving devices may be used to increase airflow through the cage member 108 and over the pluggable module(s) 106.

The cage sleeve 114 defines a chamber 119 extending between the front and rear ends 110, 112. The cage liner(s) 118 is received in the chamber 119. The cage liner 118 defines a module cavity 120 that receives the pluggable module 106. The module cavity 120 extends lengthwise in a direction that is parallel to a mating axis. For the multi-port receptacle assembly 104 (FIG. 2), multiple cage liners 118 are received in the chamber 119, thus defining multiple module cavities 120 or ports for receiving multiple pluggable modules. The module cavities 120 may be stacked vertically and/or stacked horizontally.

The receptacle assembly 104 includes a communication connector 122 (shown in phantom), or multiple communication connectors 122, having a mating interface 124 for mating with the pluggable module 106. The communication connector 122 may have multiple mating interfaces when configured to mate with multiple pluggable modules 106, such as when used in a stacked cage member. The communication connector 122 is disposed at the rear end of the module cavity 120. In an exemplary embodiment, the communication connector 122 is provided at or near the rear end 112 of the cage member 108. The communication connector 122 includes electrical contacts (not shown) that are configured to be mated with the pluggable module 106. The communication connector 122 is configured to be mounted to the circuit board 102. The communication connector 122 is configured to be loaded into the cage member 108 through a bottom 126 of the cage member 108. For example, the cage member 108 is configured to be mounted to the circuit board 102 over the communication connector 122 such that the communication connector 122 passes through an opening in the bottom 126 as the cage member 108 is mounted to the circuit board 102.

In an exemplary embodiment, the module cavity 120 includes an airflow channel that allows airflow through the module cavity 120. For example, in the illustrated embodiment, the airflow channel is positioned along the top of the module cavity 120 and passes along the top of the pluggable module 106 to cool the pluggable module 106. In an exemplary embodiment, the airflow channel is open at the front end 110 and at the rear end 112 to allow airflow through the module cavity 120 along the pluggable module 106. The cage member 108 includes airflow openings in the cage member 108, such as at the rear end 112 and/or at the top to allow airflow therethrough. The airflow openings may be sized to limit or reduce EMI leakage through the cage member 108.

Figure 3:
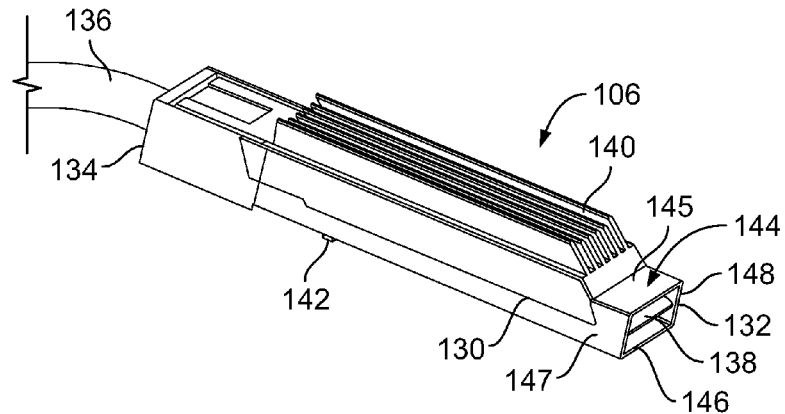
FIG. 3 is a front perspective view of a pluggable module of the communication system.

FIG. 3 is a front perspective view of the pluggable module 106 in accordance with an exemplary embodiment. The pluggable module 106 is an input/output cable assembly having a pluggable body 130. The pluggable body 130 includes a mating end 132 and an opposite cable end 134. A cable 136 is coupled to the pluggable body 130 at the cable end 134. The pluggable body 130 also includes an internal circuit board 138 that is communicatively coupled to electrical wires or optical fibers (not shown) of the cable 136.

The mating end 132 is configured to be inserted into the module cavity 120 (shown in FIG. 1). The pluggable module 106 includes one or more latches 142 used to secure the pluggable module 106 in the cage member 108 (shown in FIG. 1). For example, the latches 142 may be provided at the bottom, such as near both sides of the pluggable body 130.

The pluggable module 106 includes a mating perimeter 144 forward of the mating end 132 (for example, toward the cable end 134 from the mating end 132) of the pluggable module 106. Optionally, the mating perimeter 144 may be at or near the mating end 132, such as closer to the mating end 132 than the cable end 134. The mating perimeter 144 is defined by one or more surfaces of the pluggable body 130 configured to be engaged by the cage member 108 to electrically connect the cage member 108 to the pluggable body 130. For example, the mating perimeter 144 may be defined by a top 145, a bottom 146 and opposite sides 147, 148 of the pluggable body 130. In an exemplary embodiment, the mating perimeter 144 surrounds the portion of the pluggable body 130 that receives the mating interface 124 (shown in FIG. 1) of the communication connector 122 (shown in FIG. 1).

In an exemplary embodiment, the pluggable body 130 provides heat transfer for the internal circuit board 138, such as for the electronic components on the internal circuit board 138. For example, the internal circuit board 138 is in thermal communication with the pluggable body 130 and the pluggable body 130 transfers heat from the internal circuit board 138. In an exemplary embodiment, the pluggable body 130 includes a plurality of heat transfer fins 140 along at least a portion of the outer perimeter of the pluggable module 106. For example, in the illustrated embodiment, the fins 140 are provided along the top; however the fins 140 may additionally or alternatively be provided along the sides and/or the bottom. The fins 140 transfer heat away from the main shell of the pluggable body, and thus from the internal circuit board and associated components. The fins 140 are separated by gaps that allow airflow or other cooling flow along the surfaces of the fins 140 to dissipate the heat therefrom. In the illustrated embodiment, the fins 140 are parallel plates that extend lengthwise; however the fins 140 may have other shapes in alternative embodiments, such as cylindrical or other shaped posts.

Figure 4:
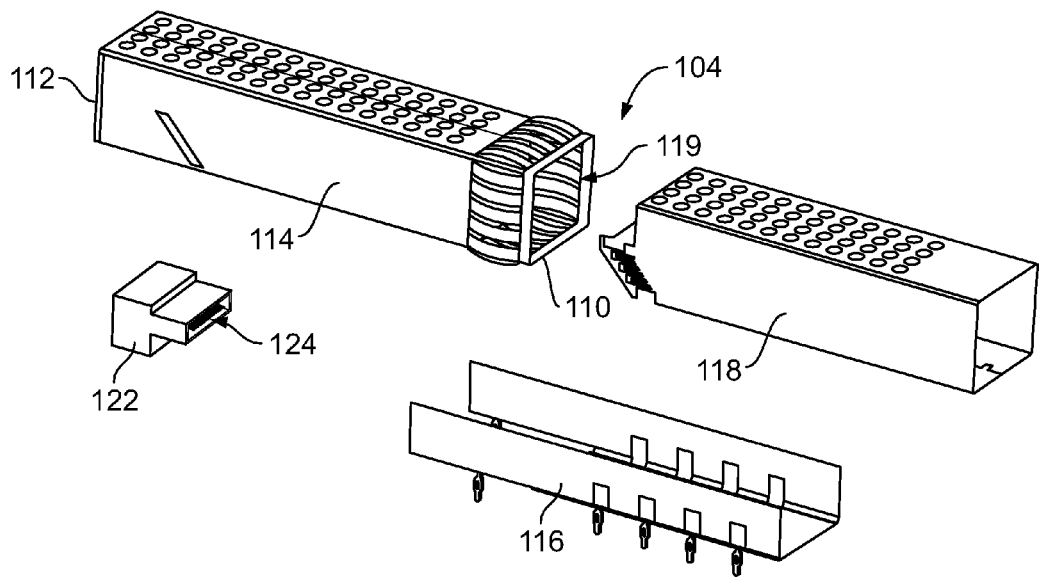
FIG. 4 is an exploded view of the receptacle assembly shown in FIG. 1 having a cage member in accordance with an exemplary embodiment.

FIG. 4 is an exploded view of the receptacle assembly 104 in accordance with an exemplary embodiment. FIG. 4 shows the cage sleeve 114 having the chamber 119 and the cage liner 118 poised for loading into the chamber 119. The front end 110 is open to receive the cage liner 118. FIG. 4 also shows the base 116 below the cage sleeve 114 configured to be mounted to the bottom of the cage sleeve 114. FIG. 4 also shows the communication connector 122 positioned below the cage sleeve 114. The communication connector 122 is configured to be received in the chamber 119 at the rear end 112. A portion of the bottom of the cage sleeve 114 may be open to receive the communication connector 122. Optionally, the communication connector 122 may be mounted to the circuit board 102 (FIG. 1) and the cage member 108 may be mounted to the circuit board 102 over the communication connector 122.

Figure 5:
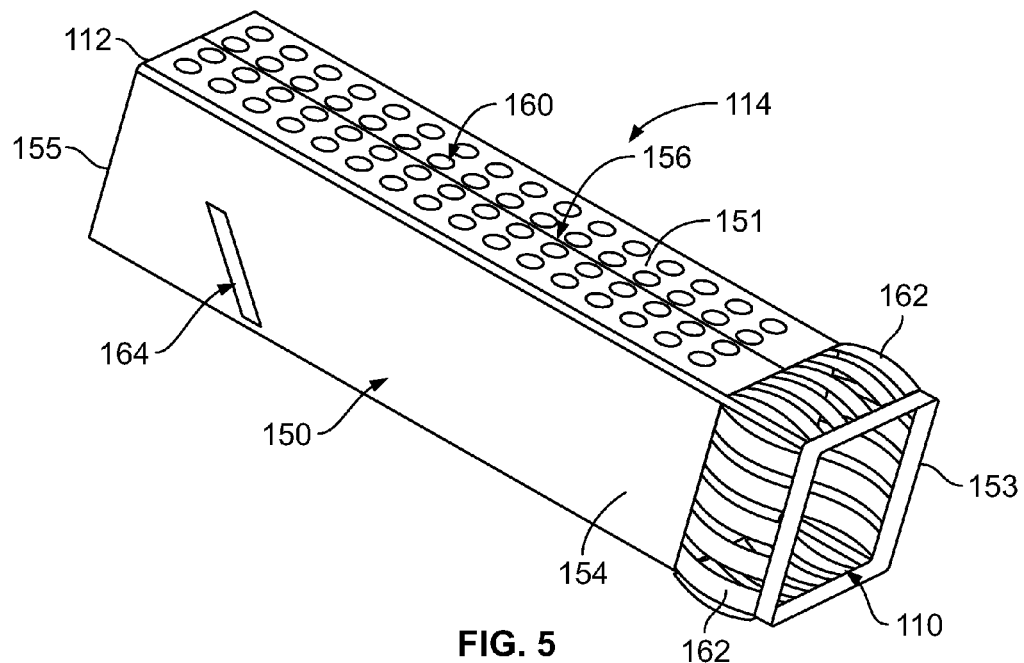
FIG. 5 is a top perspective view of a cage sleeve of the cage member in accordance with an exemplary embodiment.
Figure 6:
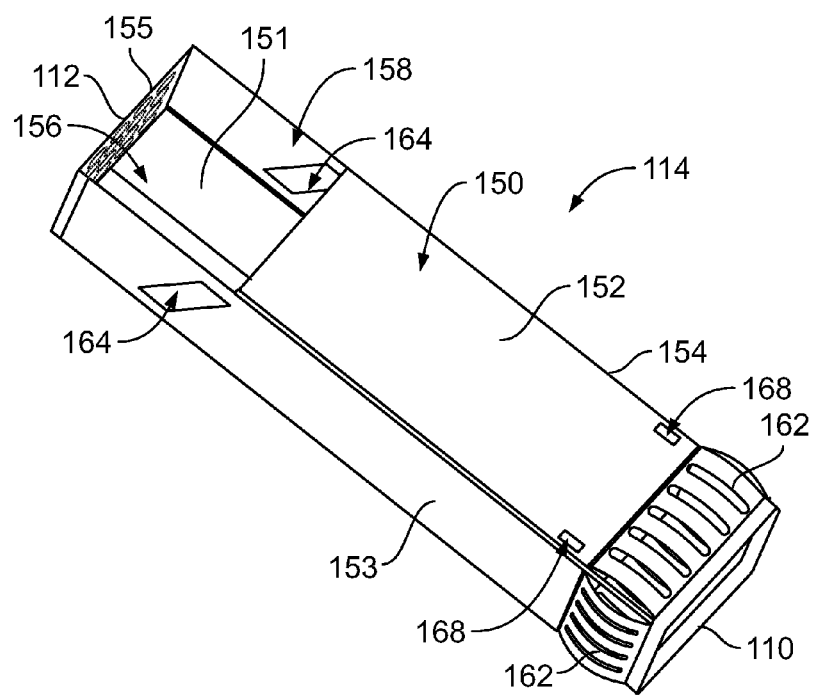
FIG. 6 is a bottom perspective view of the cage sleeve in accordance with an exemplary embodiment.

FIG. 5 is a top perspective view of the cage sleeve 114 in accordance with an exemplary embodiment. FIG. 6 is a bottom perspective view of the cage sleeve 114 in accordance with an exemplary embodiment. The cage sleeve 114 is formed from a plurality of interconnected panels or sheets, which define cage walls 150. For example, the cage sleeve 114 includes a top wall 151, a bottom wall 152, first and second side walls 153, 154 and a rear wall 155 at the rear end 112. The cage sleeve 114 may include a seam 156 along the top wall 151. The seam 156 may be covered by the cage liner 118 (shown in FIG. 7) such that the seam 156 is not an EMI leakage point. The cage sleeve 114 may include a front wall at the front end 110 or other walls. The panels or sheets may be stamped and formed from sheet metal. In an exemplary embodiment, the cage sleeve 114 may include one or more interior panels defining an interior wall(s). The interior panels may divide the cage sleeve 114 into separate sub-chambers for receiving different cage liners 118 (shown in FIG. 1) (for example, stacked as an upper chamber and a lower chamber and/or ganged as side-by-side chambers).

In an exemplary embodiment, the bottom wall 152 includes a communication connector opening 158 (FIG. 6) therethrough that receives the communication connector 122 (shown in FIG. 4). The cage sleeve 114 includes a plurality of airflow vents 160 through one or more of the cage walls 150. For example, in the illustrated embodiment, the top wall 151 includes airflow vents 160; however, the sidewalls 153, 154 and/or the rear wall 155 may additionally or alternatively include airflow vents 160.

In an exemplary embodiment, the cage sleeve 114 includes panel contacts springs 162 at or near the front end 110 configured to engage the panel 109 (FIG. 1) surrounding the cage member 108. The panel contact springs 162 are formed integral with the cage walls 150. The panel contact springs 162 may be bowed outward to engage the panel 109. In the illustrated embodiment, the panel contact springs 162 are provided on multiple cage walls 150, such as the top wall 151, the bottom wall 152 and the sidewalls 153, 154. The panel contact springs 162 are configured to electrically connect the cage sleeve 114 to the panel 109.

In an exemplary embodiment, the cage sleeve 114 includes spring release slots 164 in the sidewalls 153, 154. The spring release slots 164 provide a relief space for liner spring beams or liner contact springs 182, of the cage liner 118 (shown in FIG. 4) to deflect when engaging the pluggable module 106, as described in further detail below. The spring release slots 164 may be located near the rear end 112, such as in the vicinity of the area of the cage sleeve 114 that receives the communication connector 122. As such, the spring release slots 164 may be positioned near the mating interface 124 (shown in FIG. 1) between the communication connector 122 and the pluggable module 106. In the illustrated embodiment, the spring release slots 164 are angled nonparallel to the rear wall 155.

In an exemplary embodiment, the cage sleeve 114 includes one or more latch slots 168 (FIG. 6) in the bottom wall 152. The latch slots 168 are configured to receive the latches 142 (shown in FIG. 3) of the pluggable module 106. The latch slots 168 are small openings sized for EMI containment.

Figure 7:
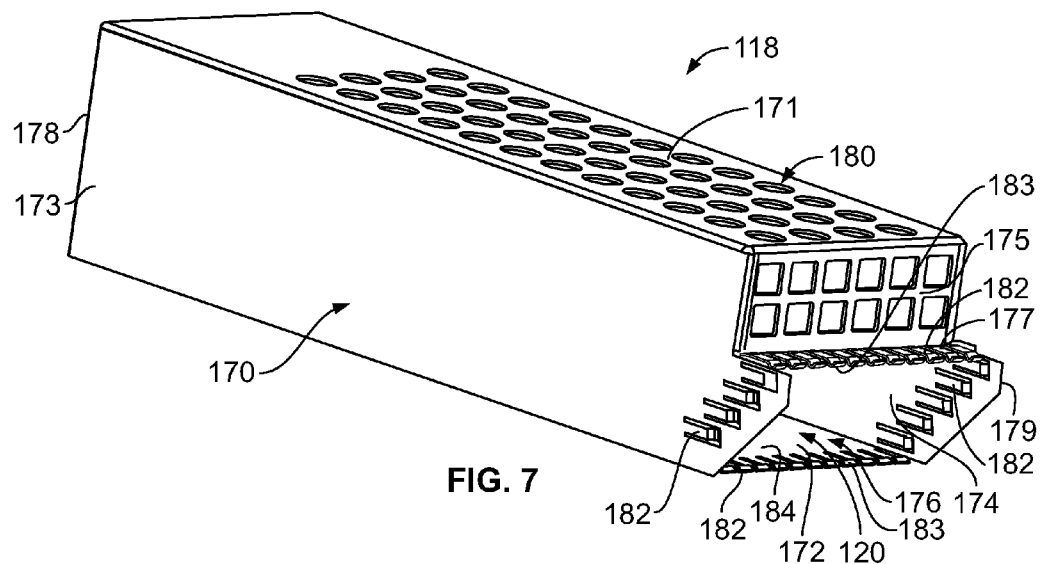
FIG. 7 is a rear perspective view of a cage liner of the cage member in accordance with an exemplary embodiment.
Figure 8:
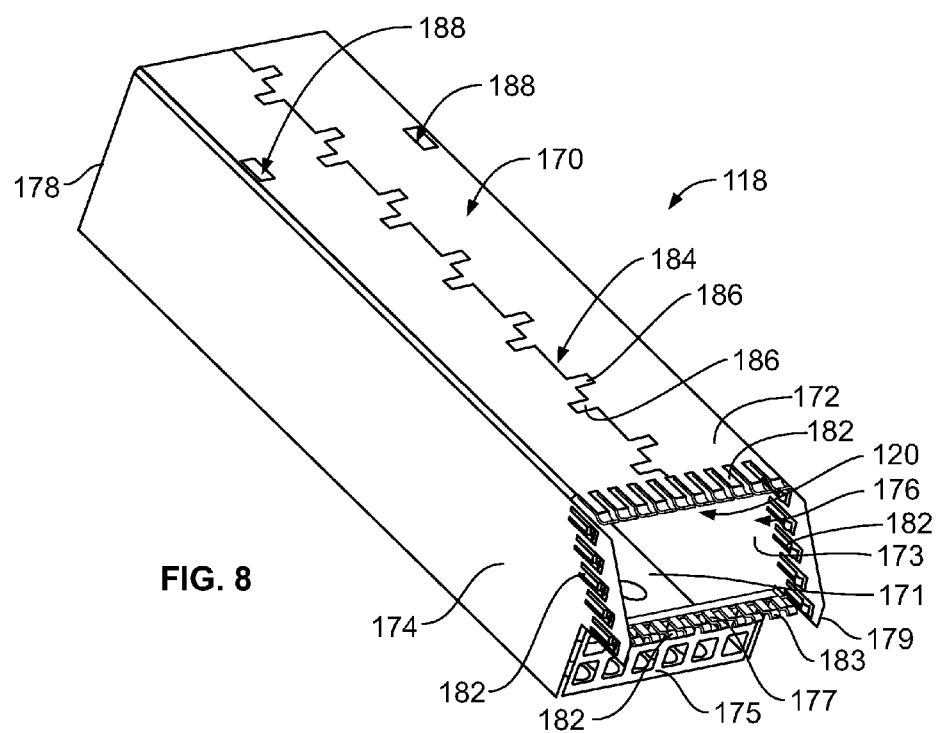
FIG. 8 is a bottom perspective view of the cage liner.

FIG. 7 is a rear perspective view of the cage liner 118 in accordance with an exemplary embodiment. FIG. 8 is a bottom perspective view of the cage liner 118. The cage liner 118 is formed from a plurality of interconnected panels or sheets, which define liner walls 170. For example, the cage liner 118 includes a top wall 171, a bottom wall 172, first and second side walls 173, 174 and a rear wall 175. Optionally, the rear wall 175 includes a connector opening 176 at or near the bottom wall 172 that is configured to receive a portion of the communication connector 122. Optionally, the rear wall 175 may include a ledge 177 above the connector opening 176. The cage liner 118 extends between a front end 178 and a rear end 179. The rear wall 175 is provided at the rear end 179. The cage liner 118 may include a front wall at the front end 178 or other walls. The panels or sheets may be stamped and formed from sheet metal. The liner walls 170 enclose the module cavity 120. For example, the liner walls 170 surround the module cavity 120 along the entire length of the cage liner 118 from the front end 178 to the rear end 179. The liner walls 170 provide EMI shielding on all sides of the pluggable module 106 (FIG. 1) for the entire length of the cage liner 118.

The cage liner 118 includes a plurality of airflow vents 180 through one or more of the liner walls 170. For example, in the illustrated embodiment, the top wall 171 includes airflow vents 180 and the rear wall 175 includes airflow vents 180 near the top end, such as above the ledge 177; however, the sidewalls 173, 174 may additionally or alternatively include airflow vents 180. The pattern of the airflow vents 180, such as the size and layout of the airflow vents 180, may correspond to the pattern of the airflow vents 160 (shown in FIG. 5) in the cage sleeve 114 to allow airflow through both the cage sleeve 114 and the cage liner 118. In the illustrated embodiment, the positions of the airflow vents 180 allow airflow along the top of the module cavity 122 to promote airflow along the fins 140 (shown in FIG. 3) of the pluggable module 106.

In an exemplary embodiment, the cage liner 118 includes liner contact springs 182 at or near the rear end 179 configured to engage the pluggable module 106 when received in the module cavity 120. For example, the liner contact springs 182 may be positioned along the liner walls 170 to engage the mating end 132 (shown in FIG. 3) of the pluggable module 106. As such, the liner contact springs 182 may be positioned near the mating interface 124 between the communication connector 122 and the pluggable module 106. The liner contact springs 182 are formed integral with the liner walls 170. In the illustrated embodiment, the liner contact springs 182 are provided on multiple liner walls 170, such as the bottom wall 172, the sidewalls 173, 174 and the rear wall 175 along the ledge 177. As such, the liner contact springs 182 are parts of a common component and configured to engage all sides of the pluggable module 106. The liner contact springs 182 are configured to electrically connect the cage liner 118 to the pluggable module 106.

The liner contact springs 182 may be angled, shaped or formed inward into the module cavity 120 to interfere with the pluggable module 106 (FIG. 1) when the pluggable module 106 is received in the module cavity 120. The liner contact springs 182 may be curved or arc shaped at the distal ends thereof, defining mating interfaces 183 for mating with the pluggable module 106. When the liner contact springs 182 engage the pluggable module 106, the liner contact springs 182 may be deflected outward. The liner contact springs 182 on the sidewalls 173, 174 may be deflected outward into the spring release slots 164 (shown in FIG. 5) of the cage sleeve 114. In the illustrated embodiment, the liner contact springs 182 on the sidewalls 173, 174 are staggered along an angled axis between the liner contact springs 182 at the bottom wall 172 and the liner contact springs 182 at the ledge 177. The liner contact springs 182 may be angled to allow the cage member 108 to be seated over the communication connector 122, which is premounted to the circuit board 102 prior to the cage member 108 being mounted to the circuit board 102.

The cage liner 118 includes a seam 184 along the bottom wall 172. The seam 184 extends between the front end 178 and the rear end 179. The seam 184 is formed where the two ends of the sheet metal used to form the cage liner 118 meet. In an exemplary embodiment, the seam 184 is nonlinear. For example, the opposing edges include a series of fingers 186 that are internested. Staggering the seam 184 improves EMI containment.

In an exemplary embodiment, the cage liner 118 includes one or more latch slots 188 in the bottom wall 172. The latch slots 188 are configured to be aligned with the latch slots 168 (shown in FIG. 6) in the cage sleeve 114 to receive the latches 142 (shown in FIG. 3) of the pluggable module 106.

Figure 9:
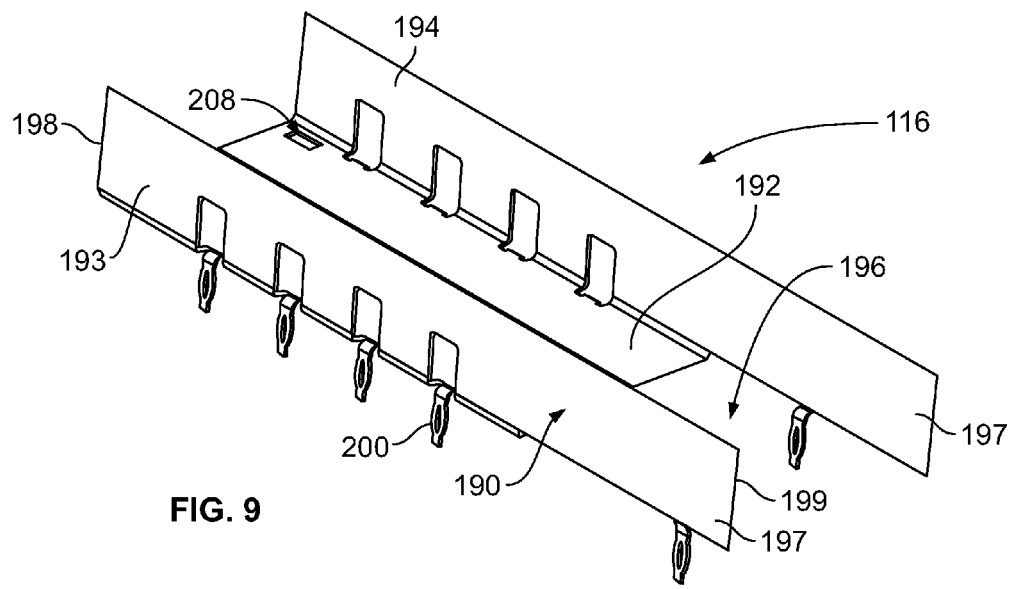
FIG. 9 is a rear perspective view of a base of the cage member in accordance with an exemplary embodiment.

FIG. 9 is a rear perspective view of the base 116 in accordance with an exemplary embodiment. The base 116 is formed from a plurality of interconnected panels or sheets, which define base walls 190. For example, the base 116 includes a bottom wall 192 and first and second side walls 193, 194. Optionally, the bottom wall 192 includes a connector opening 196 that is configured to receive a portion of the communication connector 122 (FIG. 1). The side walls 193, 194 define rails 197 along the connector opening 196. The rails 197 are configured to extend along the communication connector 122 such that the communication connector 122 is positioned between the rails 197. The base 116 extends between a front end 198 and a rear end 199. The panels or sheets may be stamped and formed from sheet metal. The base walls 190 may cover or close openings or gaps in other walls, such as the cage walls 150 (FIG. 5) and/or the liner walls 170 (FIG. 7) to enhance EMI shielding.

In an exemplary embodiment, the base 116 includes compliant pins 200 extending below the bottom wall 192. The compliant pins 200 may be stamped out of the sidewalls 193, 194 and bent downward below the bottom wall 192. The compliant pins 200 are used to mount the cage member 108 to the circuit board 102 (shown in FIG. 1). The compliant pins 200 may be press-fit in plated vias in the circuit board 102. In the illustrated embodiment, the compliant pins 200 are eye-of-the-needle pins; however other types of pins may be used in alternative embodiments to mechanically and electrically connect the cage member 108 to the circuit board 102.

In an exemplary embodiment, the base 116 includes one or more latch slots 208 in the bottom wall 192. The latch slots 208 are configured to be aligned with the latch slots 168 (shown in FIG. 6) in the cage sleeve 114 and the latch slots 188 (shown in FIG. 8) to receive the latches 142 (shown in FIG. 3) of the pluggable module 106.

Figure 10:
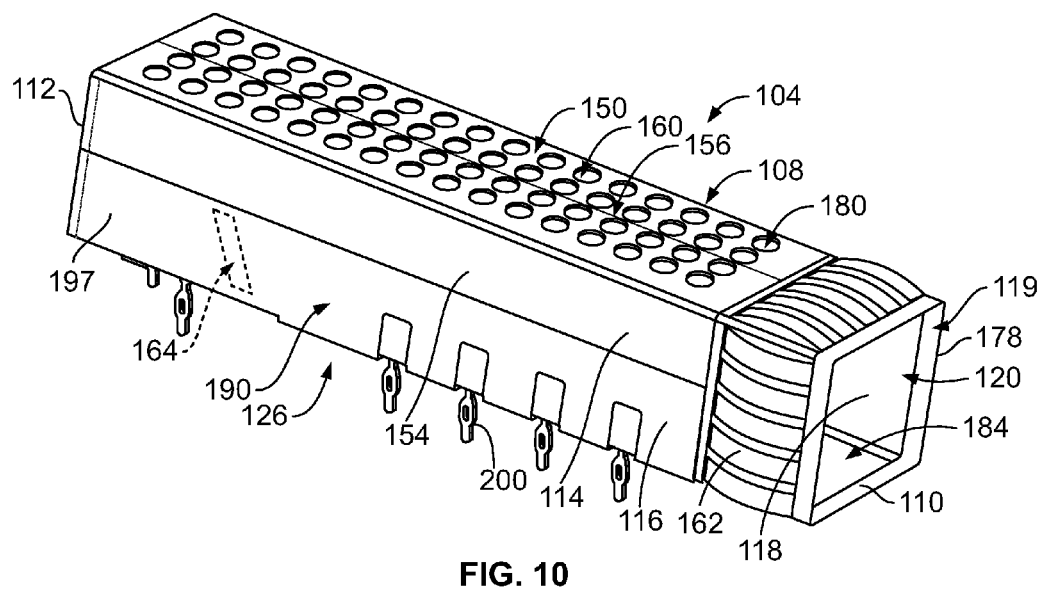
FIG. 10 is a front perspective view of the receptacle assembly in an assembled state.

FIG. 10 is a front perspective view of the receptacle assembly 104 in an assembled state. FIG. 11 is a bottom perspective view of the receptacle assembly 104 in an assembled state showing the communication connector 122 and the pluggable module 106 in the cage member 108. When assembled, the cage liner 118 is received in the chamber 119 of the cage sleeve 114. The communication connector 122 is received in the chamber 119 rearward of the cage liner 118 and the cage sleeve 114 surrounds the communication connector 122 (for example, along the sides and top of the communication connector 122). The airflow vents 160, 180 of the cage sleeve 114 and the cage liner 118, respectively, are aligned with each other to allow airflow into or out of the module cavity 120. The base 116 is coupled to the bottom of the cage sleeve 114 and provides EMI shielding along the bottom 126 of the cage member 108. The compliant pins 200 extend from the base 116 for mounting the cage member 108 to the circuit board 102 (shown in FIG. 1).

In an exemplary embodiment, the cage liner 118 extends a majority of a length of the chamber 119 to provide EMI shielding for the pluggable module 106. For example, the front end 178 of the cage liner 118 may be provided at or near the front end 110 of the cage sleeve 114. The rear end 179 of the cage liner 118 is provided near the rear end 112 of the cage sleeve 114. For example, the rear end 179 may be positioned closer to the rear end 112 than the front end 110. The rear end 179 may be positioned immediately forward of the communication connector 122. As such, the rear end 179 is positioned at or near the mating interface 124. The liner contact springs 182 are generally aligned with the communication connector opening 158. The liner contact springs 182 (shown in FIGS. 7 and 8) may be aligned with the mating perimeter 144 at the mating end 132 of the pluggable module 106.

The liner contact springs 182 are interior of the cage walls 150 and the base walls 190 to engage the pluggable module 106 in the module cavity 120 around the mating perimeter 144 of the pluggable module 106. The liner contact springs 182 are deflectable and are elastically deformed against the mating perimeter 144 when the pluggable module 106 is mated with the communication connector 122. The liner contact springs 182 have mating interfaces 183 configured to engage and electrically connect to the pluggable module 106. Providing the liner contact springs 182 interior of the module cavity 120 remote from the front end 110 moves the EMI component away from the front end 110 and the opening to the module cavity 120 at the front end 110, which leaves the module cavity 120 open to allow airflow therethrough for cooling the pluggable module 106. For example, conventional cage members provide EMI shielding at the front end 110 by using EMI springs or shields that narrow the opening to the module cavity 120 and reduce airflow into the module cavity 120. However, the cage member 108 utilizes the liner contact springs 182 at the mating end 132 of the plug module 106 and also provides the panel contact springs 162 at the front end 110 around the exterior of the cage member 108, leaving the interior airflow channel for the module cavity 120 open to allow airflow along the pluggable module 106.

The spring release slots 164 in the cage sleeve 114 are shown in phantom in FIGS. 10 and 11. The spring release slots 164 provide a relief space for the liner spring springs 182 to be deflected into when engaging the pluggable module 106. The rails 197 of the base 116 cover the spring release slots 164 to provide EMI shielding along the spring release slots 164. As such, the spring release slots 164 are not an EMI leakage path.

In an exemplary embodiment, the cage liner 118 extends along various openings in the cage sleeve 114 to improve EMI performance of the cage member 108. For example, the cage liner 118 extends to the front end 110. The cage liner 118 extends along the openings defined by the panel contact springs 164 to provide shielding along the panel contact springs 164. As such, the spaces between the panel contact springs 164 are not EMI leakage paths. Similarly, the bottom wall 152 of the cage sleeve 114 extends along the seam 184 of the cage liner 118 to provide shielding along the seam 184. As such, the seam 184 is not an EMI leakage path. Additionally, the sidewalls 153, 154 fill or cover openings defined in the base 116 due to forming the compliant pins 200. As such, the openings in the base 116 are not an EMI leakage path.

When assembled, the cage member 108 provides EMI containment for the pluggable module 106 and the communication connector 122 by using multiple pieces to cover openings in other pieces, such as openings occurring from stamping and forming of the pieces of the cage member 108. The cage liner 118 provides an electrical path between the pluggable module 106 and the cage sleeve 114, using the liner contact springs 182 to directly engage the pluggable module 106. The cage sleeve 114 provides an electrical path to the panel 109, using the panel contact springs 162 to directly engage the panel 109.

FIG. 12 is a top perspective view of the rear end 179 of the cage liner 118 showing the pluggable module 106 received in the cage liner 118. FIG. 13 is a bottom perspective view of the rear end 179 of the cage liner 118 showing the pluggable module 106 received in the cage liner 118. The liner contact springs 182 are provided on the side walls 173, 174 and the bottom wall 172 for engaging corresponding sides 147, 148 and bottom 146 of the pluggable body 130. The liner contact springs 182 are provided on the ledge 177 for engaging the top 145 of the pluggable body 130. As such, the liner contact springs 182 surround the mating perimeter 144 of the pluggable module 106 to provide EMI containment at the mating interface 124 with the communication connector 122 (shown in FIG. 11). The liner contact springs 182 are deflectable and are elastically deformed against the mating perimeter 144 when the pluggable module 106 is received in the cage liner 118. The liner contact springs 182 have mating interfaces 183 configured to engage and electrically connect to the pluggable module 106.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled.

As used in the description, the phrase "in an exemplary embodiment" and the like means that the described embodiment is just one example. The phrase is not intended to limit the inventive subject matter to that embodiment. Other embodiments of the inventive subject matter may not include the recited feature or structure. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

What is claimed is:

1. A connector assembly comprising:
a cage member for EMI containment for a pluggable module, the cage member having a cage sleeve defining a chamber, a base coupled to the cage sleeve and extending along a bottom of the cage member, and a cage liner received in the chamber, the cage liner defining a module cavity configured to receive the pluggable module;
the cage sleeve extends between a front end and a rear end and includes a plurality of cage walls defining the chamber, the cage walls being configured to surround a communication connector at or near the rear end;
the cage liner is electrically connected to the cage sleeve and is configured to surround a mating perimeter of the pluggable module forward of a mating end of the pluggable module configured to be mated with the communication connector, the cage liner extends a majority of a length of the pluggable module within the chamber to provide EMI shielding for the pluggable module, the cage liner providing an electrical path between the pluggable module and the cage sleeve.

2. The connector assembly of claim 1, wherein the cage liner includes plural liner contact springs configured to surround the mating perimeter of the pluggable module, the liner contact springs being deflectable and being elastically deformed against the mating perimeter when the pluggable module is mated with the communication connector, the liner contact springs having mating interfaces configured to engage and electrically connect to the pluggable module.

3. The connector assembly of claim 1, wherein the cage liner encloses the pluggable module and the cage sleeve encloses the cage liner.

4. The connector assembly of claim 1, wherein the cage liner extends between a front end and a rear end, the front end being provided at or near the front end of the cage sleeve, the rear end being provided generally forward of the communication connector.

5. The connector assembly of claim 1, wherein the cage liner includes a plurality of liner walls defining the module cavity, the liner walls including a top wall, a bottom wall and sidewalls therebetween, the liner walls extending to the front end of the cage sleeve.

6. The connector assembly of claim 5, wherein the liner walls include a rear wall at a rear end of the cage liner, the rear wall having a ledge, the ledge having liner spring beams configured to engage the mating perimeter at a top of the pluggable module, the sidewalls having liner spring beams configured to engage the mating perimeter at sides of the pluggable module, the bottom wall having liner spring beams configured to engage the mating perimeter at a bottom of the pluggable module.

7. The connector assembly of claim 5, wherein the side walls include liner spring beams configured to engage the mating perimeter of the pluggable module.

8. The connector assembly of claim 7, wherein the cage walls include spring release slots outside of the liner spring beams providing a relief space for the liner spring beams to deflect into when engaging the pluggable module.

9. The connector assembly of claim 8, wherein the base covers the spring release slots to provide EMI shielding along the spring release slots.

10. The connector assembly of claim 1, wherein the cage sleeve includes panel contact springs at the front end configured to engage a panel surrounding the cage member.

11. The connector assembly of claim 1, wherein the cage sleeve includes airflow vents in the cage walls, the cage liner includes liner walls having airflow vents in flow communication with the airflow vents in the cage walls to provide airflow between the module cavity and the exterior environment.

12. The connector assembly of claim 1, wherein the chamber of the cage sleeve receives multiple cage liners receiving corresponding pluggable modules, the base extending below each of the cage liners.

13. The connector assembly of claim 1, wherein the cage walls include latch slots, the cage liner includes latch slots aligned with the latch slots of the cage wall, and the base includes latch slots aligned with the latch slots of the cage wall, the latch slots receiving corresponding latches of the pluggable module to secure the pluggable module in the module cavity.

14. The connector assembly of claim 1, wherein the cage liner includes a bottom wall having a seam extending between a front end and a rear end of the cage liner, the base extending along an entire length of the seam to provide EMI shielding for the seam.

15. A connector assembly comprising:
a communication connector configured to be terminated to a circuit board, the communication connector having a mating interface for mating with a pluggable module; and
a cage member for EMI containment for the communication connector and the pluggable module, the cage member configured to be terminated to the circuit board, the cage member defining a chamber receiving the communication connector and configured to receive the pluggable module, the cage member comprising:
a cage sleeve including a plurality of cage walls defining the chamber, the cage sleeve extending between a front end and a rear end, the cage sleeve receiving the pluggable module through the front end, the cage sleeve surrounding the communication connector at or near the rear end;
a base coupled to the cage sleeve and extending along a bottom of the cage member between the cage sleeve and the circuit board; and
a cage liner received in the chamber, the cage liner defining a module cavity configured to receive the pluggable module, the cage liner having a front end and a rear end, the cage liner receiving the pluggable module in the module cavity through the front end, the rear end being positioned forward of the communication connector at or near the mating interface, the cage liner is configured to surround a mating perimeter of the pluggable module forward of a mating end of the pluggable module configured to be mated with the communication connector at the mating interface, the cage liner providing an electrical path between the pluggable module and the cage sleeve.

16. The connector assembly of claim 15, wherein the cage liner includes plural liner spring beams configured to surround the mating perimeter of the pluggable module, the liner spring beams being deflectable and being elastically deformed against the mating perimeter when the pluggable module is mated with the communication connector, the liner spring beams having mating interfaces configured to engage and electrically connect to the pluggable module.

17. The connector assembly of claim 15, wherein the cage liner encloses the pluggable module and the cage sleeve encloses the cage liner.

18. The connector assembly of claim 15, wherein the cage liner includes a plurality of liner walls defining the module cavity, the liner walls including a top wall, a bottom wall and sidewalls therebetween, the liner walls extending to the front end of the cage sleeve.

19. The connector assembly of claim 15, wherein the cage sleeve includes panel contacts spring at the front end configured to engage a panel surrounding the cage member.

20. A communication system comprising:
a pluggable module comprising a pluggable body extending between a mating end and a cable end, the pluggable body having a top and an opposite bottom with sides extending therebetween along a length of the pluggable body, the pluggable body having a mating perimeter defined by the top, the bottom and the sides along a portion of the length forward of the mating end, the pluggable module having an internal circuit board held in the pluggable body; and
a connector assembly comprising a communication connector and a cage member for EMI containment for the communication connector and the pluggable module, the communication connector having a mating interface for mating with the mating end of the pluggable module, the cage member comprising a cage sleeve, a base coupled to the cage sleeve, and a cage liner received in the cage sleeve, the cage sleeve including a plurality of cage walls defining a chamber receiving the communication connector and the pluggable module, the cage sleeve extending between a front end and a rear end, the cage sleeve receiving the pluggable module through the front end, the cage sleeve surrounding the communication connector at or near the rear end, the cage liner being positioned in the chamber forward of the communication connector, the cage liner defining a module cavity receiving the pluggable module, the cage liner surrounds the mating perimeter of the pluggable module forward of the mating end of the pluggable module, the cage liner providing an electrical path between the pluggable module and the cage sleeve.

* * * * *